United States Patent [19]

Schlereth

[11] Patent Number: 5,310,268
[45] Date of Patent: May 10, 1994

[54] MULTI-ROW ANTIFRICTION BEARING

[75] Inventor: Werner Schlereth, Schweinfurt, Fed. Rep. of Germany

[73] Assignee: FAG KugelFischer Georg Schafer KGaA, Fed. Rep. of Germany

[21] Appl. No.: 31,579

[22] Filed: Mar. 15, 1993

[30] Foreign Application Priority Data

Apr. 9, 1992 [DE] Fed. Rep. of Germany ....... 9204957

[51] Int. Cl.$^5$ ............................................. F16C 43/00
[52] U.S. Cl. ...................................... 384/537; 384/512
[58] Field of Search ............... 384/510, 512, 513, 537, 384/584, 585

[56] References Cited

U.S. PATENT DOCUMENTS 2,779,641  1/1957  Sutowski ............................. 384/502
5,066,147  11/1991  Brandenstein et al. ......... 384/532 X
5,176,457  1/1993  Hofmann et al. ................ 384/512 X

*Primary Examiner*—Thomas R. Hannon
*Attorney, Agent, or Firm*—Osterlenk, Faber, Gerb & Soffen

[57] ABSTRACT

An antifriction bearing with an outer ring having a main groove in its periphery. The groove has sharp edges which engage the interior of a housing surrounding the outer ring. Alternately, a secondary groove may adjoin an axial side or both axial sides of the main groove. A deformable material ring having its own radially outwardly facing deformation remitting groove may be disposed in the main groove in the outer ring. The deformable ring protrudes radially out of the main groove to be deformed by the internal wall of the housing around the bearing.

19 Claims, 1 Drawing Sheet

MULTI-ROW ANTIFRICTION BEARING

BACKGROUND OF THE INVENTION

The present invention refers to a multi-row antifriction bearing having a groove formed in the outer ring which improves the retention of the bearing axially in the bearing housing.

A bearing of this type is known from EP-OS 328 496. Since the manufacture of the outer ring of an antifriction bearing starts with a thin-walled metal plate, the undulating profile of the outer ring necessary for an angular bearing race is produced during its manufacture. If an antifriction bearing produced in this manner is inserted into a housing, despite its undulating shape, the bearing will not be axially fixable in position. This is because the rounded transitions in the outer surface of the outer ring enable the outer ring to move axially in the surrounding housing upon the occurrence of axial forces. Even if the housing is comprised only of soft material, poor fastening results between the outer ring and the housing. Such a bearing must therefore always be provided with additional devices which come to rest against the front sides of the outer ring.

SUMMARY OF THE INVENTION

The object of the present invention is to provide an antifriction bearing in which no additional means are necessary for axially fastening the outer ring in the housing, other than the outer ring and the housing themselves, while good fastening is nevertheless obtained.

The object is achieved with the invention. The outer ring of the bearing has a groove in its outer periphery with sharp edges of the groove that are capable of biting into the surface of the surrounding housing to retain the bearing axially in the housing. The groove preferably has a circular segment cross-sectional shape. Preferably also, the groove is in the load transmission region of the bearing outer ring which is in the axial region between two rows of bearing elements, where the outer ring is typically radially thicker.

There may be a secondary groove of circle segment cross-section at one or both axial sides of the main groove, defining additional respective edges and also making the edges of the main groove more into ridges. The secondary groove may be smaller than, and preferably about one third the cross-sectional size of the main groove.

A plastic or other deformable material ring may be disposed in the main groove, and it is shaped to protrude radially out from the outer ring, but it is deformable upon insertion of the bearing into the housing to help secure the bearing axially. The plastic ring itself may have a circular groove in its outer region which can receive the material of the ring which is deformed into that groove when the bearing is installed in the housing.

If the outer ring is comprised of a solid part, axial fastening in the housing can be obtained by simple means if the groove in the outer periphery of the outer ring has sharp edges but otherwise has the profile of a circular segment. If the groove is arranged in the large cross-section axial region between the two races for the two rows of bearing elements, upon occurrence of radial loads, a slight bending of the outer ring takes place under the load. This causes the sharp edges of the groove to dig even better into the housing. Such an embodiment can be used, in particular, in automobile wheel bearings as it simplifies the attachment of the bearing there. Further, the frequently undesired cracking noise produced by axial displacements are avoided.

A further effect of the circular segment shape of the groove is a reduction of the damping of peak stress in the region of the transmission of force between the races and the balls and this is produced by the resilience of the ring.

The above mentioned effect is increased if at least one secondary groove is provided alongside the main groove. The cross-sectional profile of the secondary groove is also that of a circular segment, and its cross section or total size is only about one third the size of the main groove. This not only makes the edges of the main groove sharper to dig more easily into the housing, but it also provides additional grooves in the loaded region of the outer ring. Both of these factors result in additional fastening of the outer ring.

Other objects features and advantages of the present invention will be apparent from the following description of the invention which refers to the accompanying drawings.

DETAILED DESCRIPTION OF THE INVENTION

Figure 1:
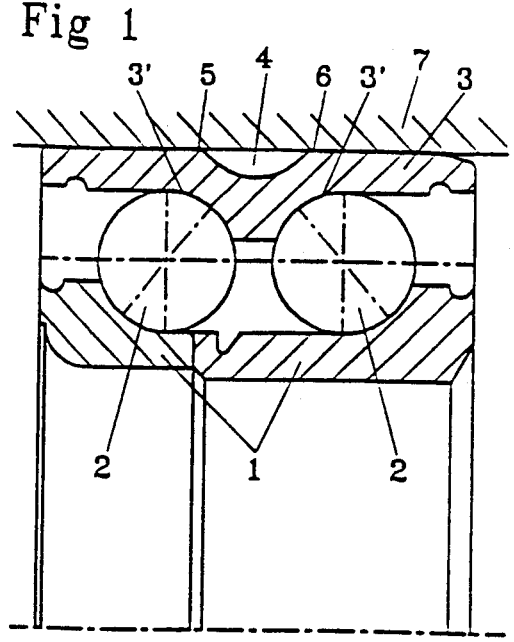
FIG. 1 is a partial cross section through a wheel bearing of a motor vehicle with one embodiment of the invention.

FIG. 1 shows a two-row ball bearing in O-arrangement comprising two inner rings 1, each having a respective inner ball race, two annular rows of bearing balls 2 and a single piece outer ring 3 on which two axially separated outer ball races are formed. The outer ring has in its outer periphery a groove 4 having a cross section approximately the shape of a circular segment and terminating at sharp edges 5 and 6 on the outer surface. These edges of the groove in the hardened metal outer ring dig into the unhardened, and therefore softer, material of the surrounding housing 7 upon a force fit of the outer ring into the housing. This axially fastens the outer ring 3 in the housing 7. The groove 4 is rounded in its base defining a circle segment that opens wider radially outward and the groove lies axially between the races 3' for the two rows of balls. The groove causes the outer ring to become resilient at this otherwise thick, and therefore relatively rigid, axial portion, while the edges 5 and 6 can dig in still deeper under radial load. The rounded bottom groove 4 also has advantages from the standpoint of hardness. The groove also causes the wall thickness of the outer ring 3 to be of approximately the same thickness over the entire axial width. This reduces the danger of the production of internal stresses.

Figure 2:
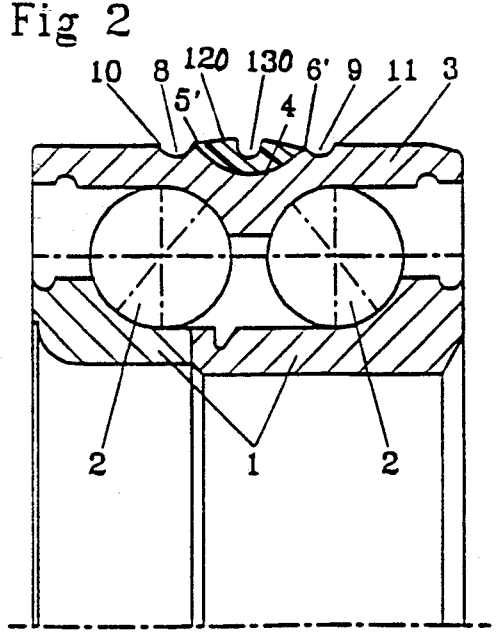
FIG. 2 shows a first variant of the embodiment of FIG. 1.

The bearing of FIG. 2 corresponds essentially to that shown in FIG. 1. In the outer surface of the outer ring 3, smaller secondary grooves 8 and 9 are provided on both axial sides of the main groove 4. The secondary grooves are also of circle segment cross-section. The secondary grooves are placed so that the edges 5' and 6' between adjacent grooves become sharper annular ridges which dig in better into the housing. Furthermore, additional axially outward biting edges 10 and 11 are produced. The secondary grooves have smaller cross-sections about one third the size of the main groove.

Figure 3:
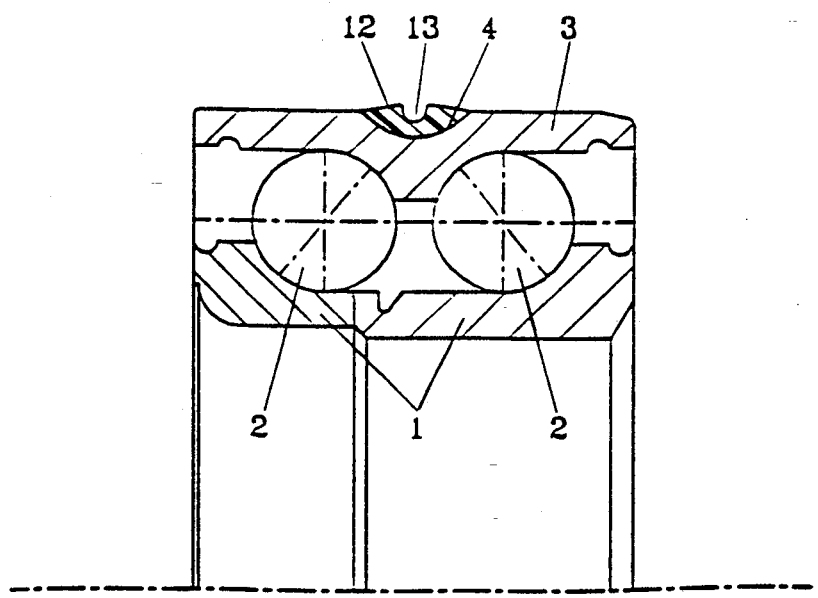
FIG. 3 shows another variant of the embodiment of FIG. 1.

The bearing embodiment of FIG. 3 is shown identical to that of FIG. 1, except that a plastic ring 12 is further fastened in the groove 4. This ring protrudes slightly outwardly beyond the outer surface of the outer ring 3 and provides material which increases the adherence of the outer ring in the housing. In order to permit damage free assembly of the bearing along with the protruding plastic ring into the bearing housing 7, a circumferential open groove 13 is provided in the plastic ring. The plastic which is pressed away and deformed during mounting of the bearing can collect in the groove. The same type of ring 120, with a groove 130 can be provided in the main groove 4 in FIG. 2.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An antifriction bearing having an outer ring, an inner ring inside the outer ring, two axially spaced rows of rolling bearing elements between the outer and inner rings;
    the outer ring have a radially outer periphery; a main groove defined in the periphery of the outer ring axially between the rows of rolling elements, the main groove having and being defined by edges of the main groove at the periphery of the outer ring;
    a secondary groove axially adjoining the main groove and defined in the periphery of the outer ring; the secondary groove having the shape of a circular segment opening wider toward the periphery of the outer ring; the secondary groove having a cross section of about one-third the size of the cross section of the main groove.

2. The bearing of claim 1, wherein the main groove has the cross sectional shape of a circular segment opening wider toward the periphery of the outer ring.

3. The bearing of claim 1, wherein the secondary groove has the shape of a circular segment opening wider toward the periphery of the outer ring.

4. In combination, the bearing of claim 1 and a housing around the outer periphery of the bearing outer ring, the housing having an opening defined by an internal wall which is shaped to the outer ring, so that the edges of the main groove engage the internal wall of the housing opening.

5. The bearing of claim 1, further comprising a respective secondary groove axially adjoining each axial side of the main groove in the periphery of the outer ring.

6. The bearing of claim 5, wherein each secondary groove has a cross section of about one-third the size of the cross section of the main groove.

7. The bearing of claim 6, wherein each secondary groove has the shape of a circular segment.

8. The bearing of claim 6, wherein each secondary groove is axially near enough to the main groove as to define an edge between them which can bite into a housing around the outer ring.

9. The bearing of claim 5, further comprising a deformable material ring in the main groove in the outer ring, the deformable ring being shaped to protrude beyond the outer periphery of the outer ring.

10. The bearing of claim 9, wherein the deformable ring itself has a second circumferential second groove defined in its radially outwardly facing side, the groove providing an area for receiving deformed material of the deformable ring and placed in the housing around the ring.

11. An antifriction bearing having an outer ring, an inner ring inside the outer ring, two axially spaced rows of rolling bearing elements between the outer and inner rings;
    the outer ring have a radially outer periphery; a main groove defined in the periphery of the outer ring axially between the rows of rolling elements, the main groove having and being defined by edges of the main groove at the periphery of the outer ring;
    a deformable material ring in the main groove, the deformable material ring being shaped to protrude beyond the periphery of the outer ring of the bearing.

12. The bearing of claim 11, wherein in the axial region between the rows of rolling elements, the outer ring has a larger radial cross section, and the main groove is defined in that axial region between the rows of rolling elements.

13. The bearing of claim 11, wherein the deformable ring protrudes, at least in its axially central region between the rows of bearing elements.

14. The bearing of claim 11, wherein the deformable ring itself has a second circumferential groove defined in its radially outwardly facing side, the second groove providing an area for receiving deformed material of the deformable ring when the bearing is placed in a housing around the ring.

15. The bearing of claim 11, wherein the deformable ring is of plastic material.

16. The bearing of claim 11, wherein the deformable ring is of a rubber material.

17. In combination, the bearing of claim 11 and a housing around the outer periphery of the bearing outer ring, the housing having an opening defined by an internal wall which is shaped to the outer ring, so that the deformable ring engages the internal wall of the housing opening.

18. An antifriction bearing having an outer ring, an inner ring inside the outer ring, two axially spaced rows of rolling bearing elements between the outer and inner rings;
    the outer ring have a radially outer periphery; a main groove defined in the periphery of the outer ring axially between the rows of rolling elements, the main groove having and being defined by edges of the main groove at the periphery of the outer ring;
    a secondary groove axially adjoining the main groove and defined in the periphery of the outer ring;
    a deformable material ring in the main groove in the outer ring, the deformable ring being shaped to protrude beyond the outer periphery of the outer ring.

19. The bearing of claim 18, wherein the deformable ring itself has a second circumferential groove defined in its radially outwardly facing side, the second groove providing an area for receiving deformed material of the deformable ring and placed in the housing around the ring.

* * * * *